United States Patent
Bellows et al.

(10) Patent No.: US 7,640,724 B2
(45) Date of Patent: Jan. 5, 2010

(54) SYSTEM AND METHOD FOR IMPROVING THE HEAT RATE OF A TURBINE

(75) Inventors: James C. Bellows, Maitland, FL (US); Abol H. Moulavi, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 747 days.

(21) Appl. No.: 11/339,720

(22) Filed: Jan. 25, 2006

(65) Prior Publication Data
US 2007/0169485 A1 Jul. 26, 2007

(51) Int. Cl.
*F02C 6/00* (2006.01)
(52) U.S. Cl. .................. 60/39.182; 60/775; 60/39.53
(58) Field of Classification Search .......... 60/775, 60/39.182, 39.54, 39.511, 685–690; 122/1 R, 122/4 D, 7 R, 459
See application file for complete search history.

(56) References Cited

U.S. PATENT DOCUMENTS

| | | | | |
|---|---|---|---|---|
| 3,257,806 A | * | 6/1966 | Stahl | 60/655 |
| 3,660,980 A | * | 5/1972 | Knirsch et al. | 60/686 |
| 3,731,488 A | * | 5/1973 | Sasakura et al. | 60/645 |
| 3,851,474 A | * | 12/1974 | Heller et al. | 376/378 |
| 3,851,702 A | * | 12/1974 | Heller et al. | 165/110 |
| 4,187,146 A | * | 2/1980 | Shen et al. | 376/316 |
| 4,449,368 A | * | 5/1984 | Haynie | 60/652 |
| 4,875,436 A | * | 10/1989 | Smith et al. | 122/7 R |
| 4,896,500 A | | 1/1990 | Pavel et al. | |
| 5,060,600 A | * | 10/1991 | Brown et al. | 122/379 |
| 5,379,588 A | * | 1/1995 | Tomlinson et al. | 60/39.182 |
| 5,518,366 A | | 5/1996 | Gray | |
| 5,577,377 A | * | 11/1996 | Tomlinson | 60/783 |
| 5,779,435 A | | 7/1998 | Lageder et al. | |
| 5,867,977 A | | 2/1999 | Zachary et al. | |
| 5,873,238 A | * | 2/1999 | Bellows | 60/39.182 |
| 5,934,063 A | * | 8/1999 | Nakhamkin | 60/773 |
| 6,019,070 A | * | 2/2000 | Duffy | 122/209.1 |
| 6,220,013 B1 | | 4/2001 | Smith | |
| 6,237,543 B1 | * | 5/2001 | Charoton et al. | 122/7 R |
| 6,447,247 B1 | | 9/2002 | Geiger | |
| 6,474,069 B1 | | 11/2002 | Smith | |
| 6,539,717 B2 | * | 4/2003 | Kitz | 60/641.2 |
| 6,578,352 B2 | | 6/2003 | Morikawa et al. | |
| 7,036,317 B2 | * | 5/2006 | Tanaka et al. | 60/773 |
| 7,355,297 B2 | * | 4/2008 | Andrew et al. | 290/52 |

(Continued)

FOREIGN PATENT DOCUMENTS

JP 57-113914 * 7/1982

*Primary Examiner*—William H Rodriguez

(57) ABSTRACT

A steam cycle power plant (10) is provided that may include a steam source generating steam (40), a steam turbine (24) receiving the generated steam and discharging an exhaust steam, a condenser (44) receiving the exhaust steam and an atomizer (60) for injecting water into the exhaust steam downstream of the steam turbine (24) and upstream of a cooling surface of the condenser (44) effective to reduce a backpressure on the steam turbine (24) and improve a heat rate of the steam turbine (24). The atomizer (60) may include a plurality of symmetrical spaced fluid connections (70) and a plurality of atomizing nozzles (62) affixed proximate at least one exhaust end of the steam turbine (24). The power plant (10) may be a combined cycle power plant including a heat recovery steam generator (40) and a gas turbine engine (12).

20 Claims, 2 Drawing Sheets

U.S. PATENT DOCUMENTS

| | | |
|---|---|---|
| 7,367,192 B2 * | 5/2008 | Hattori et al. ................. 60/772 |
| 2004/0003593 A1 | 1/2004 | Sauer et al. |
| 2006/0075682 A1 * | 4/2006 | Bullinger et al. .............. 44/626 |

* cited by examiner

SYSTEM AND METHOD FOR IMPROVING THE HEAT RATE OF A TURBINE

FIELD OF THE INVENTION

This invention relates in general to power generating plants and more particularly to a method and apparatus for deaerating make-up water thereby improving the efficiency of a steam turbine.

BACKGROUND OF THE INVENTION

Power generating plants, such as one operating a combined cycle power plant are well known for generating electricity. Combined cycle power plants use both gas and steam turbines. In such a plant, the power produced by a combustion turbine may be augmented by injecting steam or water into the gas flow path.

In general, the amount of power produced in the combustion turbine through such power augmentation is greater than the amount lost in the steam cycle due to the removal of steam. Power augmentation uses an appreciable quantity of steam generated from the heat recovery steam generator. When steam is removed for power augmentation, it is necessary to supply an equivalent amount of water as 'make-up' to the steam cycle. The make-up water is typically fully oxygenated in equilibrium with the oxygen in air. The concentration of oxygen in the make-up water is higher than that required in the feedwater to the heat recovery steam generator. Thus, there is a need to remove oxygen from the make-up water.

Removal of oxygen from make-up water for deaerating is typically accomplished by spraying the make-up water into a deaerator in the condenser then transferring the deaerated make-up water to a hotwell. In the deaerator, steam may be used to strip the oxygen from the water. At low make-up water flow volumes, low-pressure exhaust steam may be used for stripping in the deaerator. However, at higher make-up water flow volumes, low-pressure steam from the heat recovery steam generator may be required for the deaerator to function properly. Using low-pressure steam to deaerate higher flow volumes of make-up water may significantly reduce the steam turbine power output thereby reducing the overall efficiency of the power plant.

DETAILED DESCRIPTION OF THE INVENTION

Figure 1:
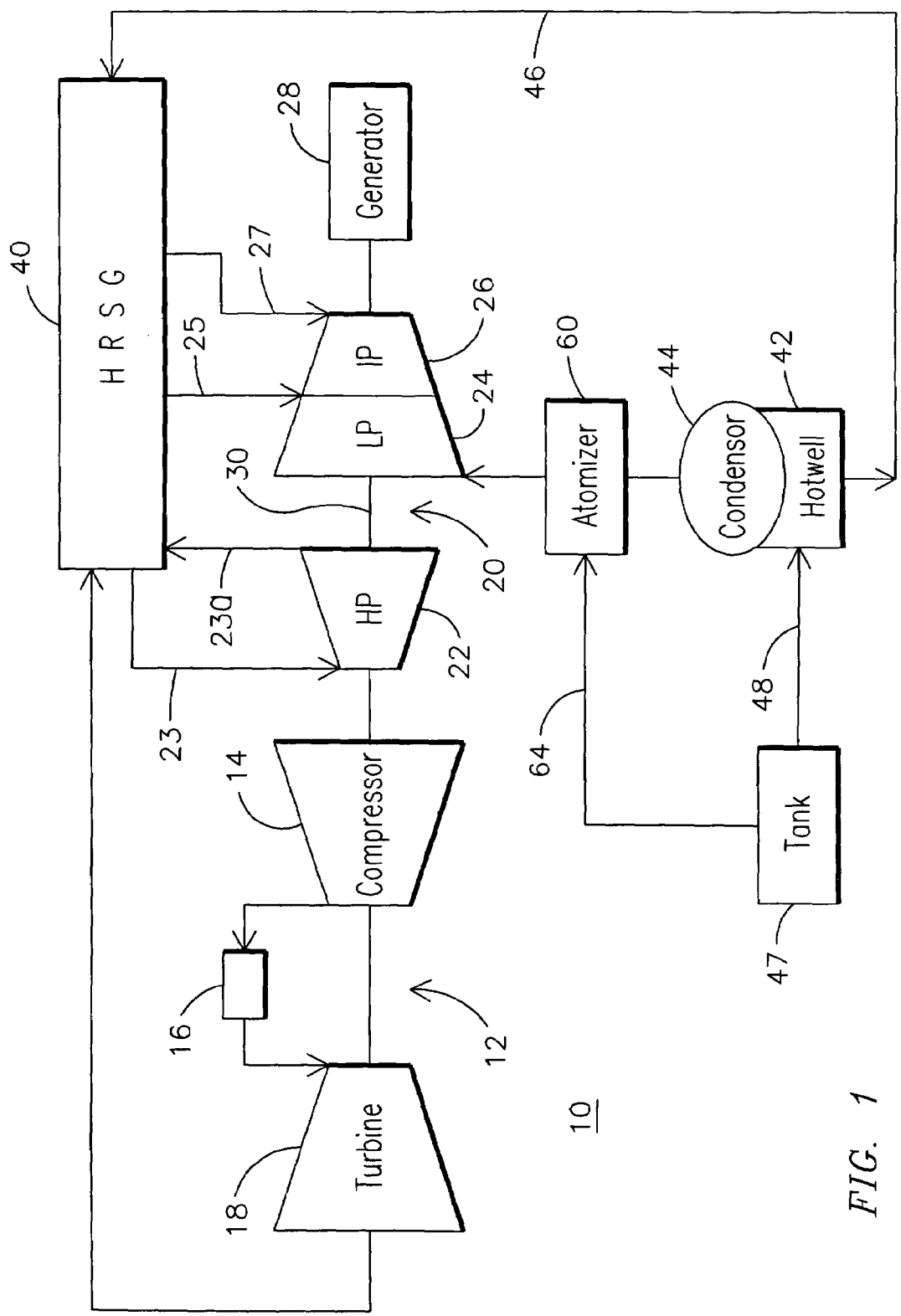
FIG. 1 is a schematic of an exemplary power plant 10.

FIG. 1 is a schematic of certain components of an exemplary power plant 10, such as a combined cycle power plant recognized by those skilled in the art. Power plant 10 may include a gas turbine engine 12 comprising a compressor 14, a combustor 16 and a gas turbine 18. A combined cycle power plant 10 may also include a steam turbine system 20 that may include a high-pressure turbine 22, one or more low-pressure turbines 24 and an intermediate-pressure turbine 26. The gas turbine engine 12 and steam turbine system 20 may drive a generator 28 for producing electricity, or other loads. The gas turbine engine 12, steam turbine system 20 and generator 28 may be arranged in tandem on a single shaft 30 as shown in FIG. 1. Alternate configurations of power plant 10 may be multi-shaft arrangements wherein the gas turbine engine 12 and steam turbine system 20 drive separate loads, as well as others recognized in the art.

Steam turbine system 20 may be associated with a multi-pressure heat recovery steam generator (HRSG) 40 for recovering waste heat from gas turbine engine 12. HRSG 40 may include low pressure, intermediate pressure and high pressure sections for providing steam to turbines 22, 24, 26, through connections 23, 25, 27, respectively. Exhaust steam from the HP turbine 22 may be returned to HRSG 40 for reheating through a connection 23a. HRSG 40 may also supply steam to gas turbine engine 12 for power augmentation, such as when gas turbine engine 12 is operating at or near base load. Under such operating conditions, up to approximately 20% of the steam generated in HRSG 40 may be used for power augmentation of turbine engine 12 resulting in a reduction in power output from steam turbine system 20.

Spent or exhaust steam from low pressure turbine 24 may be received by a condenser 44, which converts the steam into condensate that may be collected in a hotwell 42. This condensate may be supplied back to HRSG 40 via fluid connection 46 as feedwater that is used to generate steam in HRSG 40. Typically, the feedwater supplied back to HRSG 40 needs to be deaerated or degasified. Gases, typically oxygen, may be removed from the make-up water using a deaerator (not shown) that may be associated with the condenser 44 and hotwell 42, so the feedwater remains low in oxygen.

When power plant 10 is operating, it is necessary to provide feedwater to HRSG 40 to replace the steam generated. Feedwater may be supplied to HRSG 40 from hotwell 42 through fluid connection 46 using a conventional pump. As demand requires, additional make-up water may be supplied to hotwell 42 from a make-up water source, such as supply tank 47 through fluid connection 48 using a conventional pump. During start-up of power plant 10 or when it's operating at part load, a relatively low flow volume of make-up water may be required.

At low flow volumes of make-up water, such as 2 gal/min, for example, a reverse flow of exhaust steam from low-pressure turbine 24 through a deaerator may be used to degasify the water. At higher flow volumes of make-up water, such as 50 gal/min, for example, a reverse flow of steam from HRSG 40 may need to be injected through a deaerator to effectively degasify the water. Such a higher flow volume of make-up water may be required during power augmentation of gas turbine engine 12. Drawing steam off HRSG 40 for deaerating make-up water reduces the quantity of steam available to the steam turbines and consequently the power output of steam turbine system 20, which may present a cost disadvantage to an operator of power plant 10.

When steam is removed from HRSG 40 for power augmentation of gas turbine engine 12, an equivalent amount of water may be supplied as make-up water to the steam cycle. This make-up water is typically fully oxygenated in equilibrium with the oxygen in air. The concentration of oxygen in the make-up water is approximately 8500 µg/kg (ppb) or 8.5 mg/kg (ppm). The concentration of oxygen required in the feedwater to HRSG 40 may vary from approximately 2 ppb to approximately 300 ppb, depending on the chemistry regime implemented with a power plant 10. In substantially all situations, it is desirable to remove between approximately 80% and approximately 99+% of the oxygen in the make-up water supplied as feedwater to HRSG 40 in accordance with plant specifications.

The inventors of the present invention have determined that using steam from HRSG 40 to degasify water in a deaerator of a combined cycle power plant 10 may reduce the power output of steam turbine system 20 by up to approximately 0.6 MW. Embodiments of the invention allow for reducing or eliminating the need to draw steam from HSRG 40 to degasify feedwater during operation of power plant 10.

In this respect, means may be provided for injecting atomized water, which may be make-up water, under pressure into the exhaust steam of low-pressure turbine 24. A means for injecting atomized make-up water may assume various configurations such as an exemplary assembly or atomizer 60 shown in FIG. 2. Atomizer 60 may inject atomized make-up water into the exhaust steam downstream of low-pressure turbine 24 and upstream of condenser 44 as illustrated in FIG. 1. An exemplary embodiment of atomizer 60 may include a plurality of commercially available nozzles 62 for producing fogs of atomized water, such as ones available from Parker Hannifin.

In an exemplary embodiment, nozzles 62 may produce droplets with Sauter Mean Diameters of approximately 12 microns. It has been determined that a 12 micron droplet will be fully deaerated in approximately 2.4 milliseconds. This time is an estimate of an expected average lifetime for a droplet in a turbulent steam flow such as that exiting low-pressure turbine 24. Alternate exemplary embodiments allow for the droplet size to vary as a function of the amount of oxygen to be deaerated from the make-up water and the distance from low-pressure turbine 24 to condenser 44, as well as other operating parameters of power plant 10.

The make-up water drawn from tank 47 may be approximately 30° C. and pumped under pressure to atomizer 60 through fluid connection 64. The make-up water flow volume, pressurization and nozzle 62 specifications may be selected to achieve the desired droplet size. It will be appreciated that the flow of make-up water from tank 47 may be regulated between atomizer 60 and hotwell 42 to optimize the performance objectives of steam turbine system 20, HRSG 40 and/or turbine engine 12.

The performance of a steam turbine, such as low-pressure turbine 24 may generally be improved by lowering the backpressure to which the last row of blades of the turbine is subjected. Low-pressure turbine 24 may discharge to condenser 44, in which a sub-atmospheric pressure may be maintained. Typically, the exhaust steam exiting low-pressure turbine 24 is discharged axially from the last row of blades and is directed to condenser 44, which may mounted below or to the sides of low-pressure turbine 24. The axially discharged exhaust steam may be turned approximately 90° from the axial direction to a vertically downward direction. Flow guides defining an annular channel outside each exhaust end of low-pressure turbine 24 may accomplish turning of the exhaust flow and directing the flow into condenser 44. Surfaces of an outer shell and an inner casing within which low-pressure turbine 24 is contained may form such flow guides as appreciated by those skilled in the art.

The efficiency of a steam turbine is typically measured by its "heat rate", which is the amount of heat that needs to be supplied to the feedwater in order to produce a specified generator power output. The heat rate is the heat input in BTUs per hour for each kilowatt-hour of electricity produced (btu/kwh). The lower the heat rate, the less the thermal energy required and the better the efficiency.

Embodiments of atomizer 60 may be positioned downstream of the last row of blades of low-pressure turbine 24 and upstream of a first heat exchanging surface of condenser 44, such as a first row of condenser tubes carrying cooling water. For example, atomizer 60 may be affixed proximate the inlet or neck of condenser 44 so that water droplets are directed into and substantially parallel to the flow of exhaust steam discharged from low-pressure turbine 24. This causes a significant reduction in the pressure on the last row of turbine blades, which is caused by the velocity of the steam. Spraying parallel to the steam flow minimizes disturbance of the steam's velocity profile, which would occur by spraying counter current to the steam. Alternate embodiments allow for at least a portion of atomized water to be injected into the exhaust steam downstream of the first heat-exchanging surface.

Figure 2:
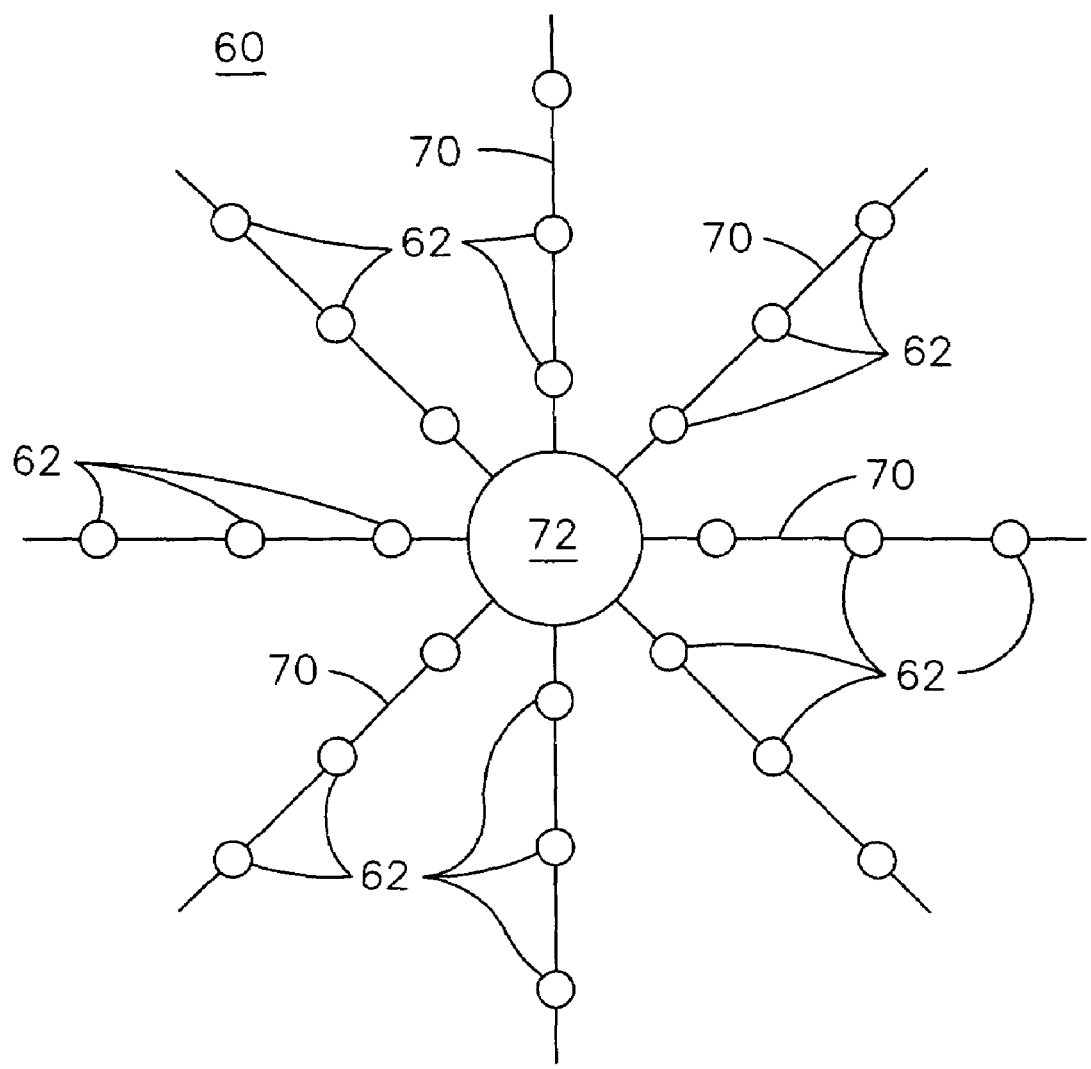
FIG. 2 is a schematic of an exemplary embodiment of a means for injection atomized water.

FIG. 2 illustrates that an embodiment of atomizer 60 may include a plurality of fluid connections 70 extending from a ring 72, which may encircle the turbine shaft (not shown) of low-pressure turbine 24. Connections 70 may be conventional pipes arranged in an array, concentric circles and/or a grid, such as symmetrically arranged fluid connections or 'spokes' 70. A plurality of nozzles 62 may be affixed to one or more spokes 70. Spokes 70 may be affixed within or proximate to the flow guide at one or both exhaust ends of low-pressure turbine 24. The plurality of nozzles 62 may be positioned so that in the event one or more nozzles 62 fails, a high velocity stream of water will not impinge condenser tubes within condenser 44. This will avoid cutting or damaging a condenser tube, which may cause a condenser leak.

It will be appreciated that the configuration of atomizer 60 shown in FIG. 2, as well as other configurations may be manufactured as a stand-alone or unitary device that is installed within a steam turbine assembly. Atomizer 60 may also be installed as individual components that form a desired configuration. For example, a plurality of individual fluid connections 70 may be affixed to an inner casing and/or outer shell of a steam turbine assembly and assume whatever configuration is desired for injecting atomized water into the exhaust steam downstream of the steam turbine exhaust and upstream of a condenser. In this respect, the precise location, size and configuration of one or more atomizers 60 and/or nozzles 62 may depend on the size of low-pressure turbine 24, flow rate of exhaust steam, amount of desired deaeration as well as other operating parameters of power plant 10.

Injecting atomized make-up water directly into exhaust steam of low-pressure turbine 24 results in some of the exhaust steam condensing onto the water droplets. This lowers the vapor pressure of the water in the exhaust steam, which reduces the backpressure on low-pressure turbine 24 and condenser 44. Unless the last stage of low-pressure turbine 24 is choked, the reduced backpressure will improve turbine efficiency resulting in an increase of power output for the same quantity of steam inlet into low-pressure turbine 24 from HRSG 40. Because the water is atomized, the diffusion of oxygen out of the water is enhanced, which provides good deaeration at the same time as it improves the heat rate of the turbine.

The inventors of the present invention have determined that a decrease in heat rate for an exemplary steam turbine system 20, such as one in a SCC6-5000F 2×1 combined cycle power plant 10 sold by the assignee of the present invention, is realized as a consequence of the reduced backpressure on low-pressure turbine 24. The decrease in heat rate may be between about 10 btu/kwh and about 18 btu/kwh. At a constant fuel rate, this decrease in heat rate translates to between about 1 MW and about 1.8 MW of additional power output from power plant 10.

Exhaust steam exiting low-pressure turbine 24 is typically moving near sonic velocity, which results in a lower effective pressure on the blades within turbine 24 relative to pressure on the blades if the exhaust steam were static. Embodiments of atomizer 60 may be configured or positioned so that the injection of make-up water into the exhaust steam does not disrupt what is a relatively even distribution of pressure on the blades within low-pressure turbine 24 during operation. This may be appreciated from the arrangement in FIG. 2, which illustrates symmetrically arranged spokes 70 extending radially from a ring 72. Alternate embodiments may include asymmetrical atomizers 60 as well as other arrangements.

In this respect, a relatively even or symmetrical distribution of nozzles 62, such as that shown in FIG. 2, may be desirable to avoid creating pressure imbalances proximate the respective ends of low-pressure turbine 24 from which exhaust steam is being discharged. The number, size and location of spokes 70 and nozzles 62 may depend on the quantity of make-up water that is being injected into the exhaust steam, the size and configuration of the path taken by exhaust steam from turbine 24 to condenser 44 as well as other factors recognized by those skilled in the art. For instance, it may be desirable to configure and position atomizer 60 to optimize the backpressure on low-pressure turbine 24, the amount of oxygen removed from the injected make-up water and the quantity of feedwater supplied to HRSG 40.

Certain power plants 10 may be configured with steam turbine systems 20 having multiple low-pressure turbines 24 and consequently multiple exhaust ends. Embodiments of the invention allow for positioning a plurality of atomizers 60 within respective low-pressure turbines 24 so that the make-up flow of water is distributed approximately equally among multiple low-pressure turbines 24. Alternate embodiments allow for the make-up water to be distributed disproportionately among multiple low-pressure turbines 24 depending on performance objectives of steam turbine system 20, HRSG 40 and/or turbine engine 12.

It will be appreciated that embodiments of the invention may be adapted for use with various types of power plants 10, including ones having an air-cooled condenser into which exhaust steam is discharged. Exhaust steam would be transferred from the turbine to the air-cooled condenser through a steam duct. In this respect, an air-cooled condenser would typically be located a distance away from a steam turbine such as low-pressure turbine 24. Consequently, the travel time of the exhaust steam from the turbine to the air-cooled condenser is greater than a configuration where the condenser is situated immediately beneath the turbine. This allows for a commensurate increase in time for injecting atomized water into the exhaust steam. It also allows for the injected water droplets to be relatively large in diameter.

An alternate embodiment is to provide a supply tank (not shown) of cool water (30° C., for example) that may be dedicated for cooling exhaust steam from low-pressure turbine 24. When no make-up water is needed from supply tank 47, cool water from a dedicated cool water supply tank could be used for cooling the exhaust steam from low-pressure turbine 24. Since no water is removed from the cycle by power augmentation in this manner, the water level in hotwell 42 would rise. Water may be withdrawn from hotwell 42 to maintain a proper operating level and returned to the top of the dedicated cool water supply tank in a manner to minimize mixing.

When ambient air is cool, such as at night, water may be withdrawn from the top of the dedicated cool water supply tank, cooled and returned to the bottom of this tank. In this respect, management of water flow from and into a dedicated cool water supply tank is similar to the water tank management for thermal energy storage, such as that used for chilling input air to a combustion turbine. Cooling exhaust steam from low-pressure turbine 24 using a dedicated cool water supply could be effective to increase megawatts from a conventional steam power plant.

Another exemplary embodiment of a system with which exemplary embodiments of the invention may be used is disclosed in U.S. Pat. No. 6,804,964, which is specifically incorporated herein by reference. In general, this patent discloses a method and apparatus for recovering water from exhaust gas of a combustion turbine engine. The recovered water may be used for various purposes including as make-up water injected into the exhaust steam of a low-pressure steam turbine.

It will be appreciated that embodiments of the invention may be adapted for use with steam turbines having various configurations of size, capacity and flow guide arrangements, for example, as well as other design and operating specifications.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim as our invention:

1. A steam cycle power plant comprising:
   a steam source generating steam;
   a steam turbine receiving generated steam and discharging an exhaust steam;
   a condenser receiving the exhaust steam; and
   an atomizer for injecting water into the exhaust steam downstream of the last row of turbine blades of the steam turbine and upstream of the condenser effective to reduce a backpressure on the steam turbine.

2. The steam cycle power plant of claim 1 further comprising:
   a make-up water supply source; and
   the atomizer comprising a fluid connection in fluid communication with the make-up water supply source and a plurality of atomizing nozzles affixed to the fluid connection.

3. The steam cycle power plant of claim 2 wherein the plurality of atomizing nozzles is distributed downstream of the steam turbine effective to maintain an even distribution of pressure on an exhaust end of the steam turbine during operation.

4. The steam cycle power plant of claim 1, the atomizer comprising a plurality of symmetrical spaced fluid connections and a plurality of atomizing nozzles affixed proximate at least one exhaust end of the steam turbine.

5. The steam cycle power plant of claim 1, the atomizer comprising a plurality of symmetrical spaced fluid connections and a plurality of atomizing nozzles effective to deaerate at least a portion of water injected into the exhaust steam upstream of the cooling surface of the condenser.

6. The steam cycle power plant of claim 1 further comprising:
   a high-pressure steam turbine;
   an intermediate-pressure steam turbine;
   at least two low-pressure steam turbines discharging the exhaust steam; and
   at least one atomizer affixed proximate each respective exhaust end of the at least two low-pressure steam turbines effective to reduce a backpressure on each respective exhaust end when water is injected into the exhaust steam.

7. The steam cycle power plant of claim 6, each of the at least one atomizers comprising a plurality of symmetrical spaced fluid connections and a plurality of atomizing nozzles, the plurality of symmetrical spaced fluid connections and the plurality of atomizing nozzles effective to deaerate water injected into the exhaust steam.

8. The steam cycle power plant of claim 1 further comprising:
a combustion turbine engine receiving a fuel and discharging an exhaust gas; and
the steam source comprising a heat recovery steam generator receiving at least a portion of the exhaust gas and generating steam wherein the steam turbine receives the generated steam from the heat recovery steam generator and discharges the exhaust steam.

9. The steam turbine power plant of claim 8, the atomizer comprising a plurality of symmetrical spaced fluid connections and a plurality of atomizing nozzles affixed proximate at least one exhaust end of the steam turbine.

10. A combined cycle power plant comprising:
a combustion turbine engine receiving a fuel and discharging an exhaust gas;
a heat recovery steam generator receiving at least a portion of the exhaust gas and generating steam;
a steam turbine receiving steam from the heat recovery steam generator and discharging an exhaust steam;
a condenser receiving the exhaust steam; and
means for injecting atomized water into the exhaust steam downstream of the last row of turbine blades of the steam turbine and upstream of the condenser effective to reduce a backpressure on the steam turbine and improve a heat rate of the steam turbine.

11. The combined cycle power plant of claim 10, the means for injecting atomized water comprising a fluid connection receiving a flow of water and a plurality of atomizing nozzles affixed to the fluid connection, the means for injecting atomized water affixed proximate an exhaust end of the steam turbine.

12. The combined cycle power plant of claim 10 wherein the plurality of atomizing nozzles is distributed downstream of the steam turbine effective to maintain an even distribution of pressure on an exhaust end of the steam turbine.

13. The combined cycle power plant of claim 10, the means for injecting atomized water comprising a plurality of symmetrical spaced fluid connections and a plurality of atomizing nozzles effective to deaerate at least a portion of water injected into the exhaust steam upstream of the cooling surface of the condenser.

14. The combined cycle power plant of claim 10, the condenser comprising an air-cooled condenser and the means for injecting atomized water is affixed within an interior portion of a steam duct transferring exhaust steam to the air-cooled condenser.

15. A method of increasing the power output of a combined cycle power plant that includes a combustion turbine engine receiving a fuel and discharging an exhaust gas, a heat recovery steam generator receiving the exhaust gas and generating steam, a steam turbine receiving the generated steam and discharging an exhaust steam to a condenser, the method comprising:
injecting atomized water into the exhaust steam downstream of a last row of blades of the steam turbine and upstream of the condenser effective to deaerate at least a portion of atomized water injected into the exhaust steam and reduce a backpressure on an exhaust end of the steam turbine.

16. The method of claim 15 further comprising injecting atomized water containing a concentration of oxygen that is greater than a concentration of oxygen required by the heat recovery steam generator during operation.

17. The method of claim 15 further comprising injecting the atomized water when steam is drawn off the heat recovery steam generator and used for power augmentation of the combustion turbine engine.

18. The method of claim 15 further comprising injecting the atomized water through a plurality of symmetrically spaced fluid connections affixed proximate an exhaust end of the steam turbine, the plurality of symmetrically spaced fluid connections comprising a plurality of atomizing nozzles.

19. The method of claim 15 further comprising injecting the atomized water from a make-up water source.

20. The method of claim 15 further comprising:
supplying a first quantity of make-up water from a make-up water source to an atomizer for injecting atomized water into the exhaust steam; and
supplying a second quantity of make-up water from the make-up water source to a hotwell of the condenser.

\* \* \* \* \*

UNITED STATES PATENT AND TRADEMARK OFFICE
CERTIFICATE OF CORRECTION

PATENT NO. : 7,640,724 B2
APPLICATION NO. : 11/339720
DATED : January 5, 2010
INVENTOR(S) : Bellows et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1017 days.

Signed and Sealed this

Sixteenth Day of November, 2010

David J. Kappos
*Director of the United States Patent and Trademark Office*